United States Patent
Hong

(10) Patent No.: US 10,989,262 B2
(45) Date of Patent: Apr. 27, 2021

(54) MOTOR VEHICLE BRAKE PAD THICKNESS DETECTION SYSTEM

(71) Applicant: Robert Bosch GmbH, Stuttgart (DE)

(72) Inventor: Zhichao Hong, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/423,303

(22) Filed: May 28, 2019

(65) Prior Publication Data
US 2019/0368562 A1  Dec. 5, 2019

(30) Foreign Application Priority Data

May 29, 2018 (CN) .......................... 201820812274.4

(51) Int. Cl.
*F16D 66/02* (2006.01)
*F16D 55/226* (2006.01)

(52) U.S. Cl.
CPC ......... *F16D 66/027* (2013.01); *F16D 55/226* (2013.01)

(58) Field of Classification Search
CPC ......... F16D 66/023–028; F16D 55/226; F16D 65/08; F16D 65/092; F16D 65/128; B60T 17/221; G01R 33/00
USPC ............ 188/1.11 E, 1.11 L, 1.11 W, 218 CL, 188/250 E; 340/453, 454; 116/208
See application file for complete search history.

(56) References Cited

U.S. PATENT DOCUMENTS

| | | | | |
|---|---|---|---|---|
| 4,240,530 A | * | 12/1980 | Tillenburg | .......... F16D 65/0006 188/250 E |
| 6,279,694 B1 | * | 8/2001 | Bohm | ..................... B60T 13/74 188/1.11 E |
| 7,481,301 B2 | * | 1/2009 | Kramer | ................. B60T 13/741 188/1.11 E |
| 9,945,437 B2 | * | 4/2018 | Eden | ..................... F16D 66/027 |
| 2005/0183909 A1 | * | 8/2005 | Rau, III | .................. F16D 65/12 188/218 XL |
| 2019/0242450 A1 | * | 8/2019 | Lin | ........................ G01R 33/00 |

* cited by examiner

*Primary Examiner* — Christopher P Schwartz
(74) *Attorney, Agent, or Firm* — Michael Best & Friedrich LLP

(57) ABSTRACT

A motor vehicle brake pad thickness detection system comprising a brake disc, a brake pad, a brake caliper and a brake pad driving means, the brake caliper having a fixing part, and the brake pad being fixed to the fixing part. A first brake pad thickness detector is provided between the brake pad and the fixing part, and a second brake pad thickness detector is provided on the brake disc in a position corresponding to the first brake pad thickness detector. The safety of the braking system is greatly improved due to the fact that the brake pad thickness detection system detects the thickness of the brake pad precisely each time braking is performed.

17 Claims, 4 Drawing Sheets

MOTOR VEHICLE BRAKE PAD THICKNESS DETECTION SYSTEM

BACKGROUND OF THE INVENTION

The present invention relates to a detection system of a motor vehicle braking system, more specifically to a motor vehicle brake pad thickness detection system.

The inability to promptly detect and ascertain the precise degree of wear of motor vehicle brake pads will inevitably cause drivers great inconvenience and put their safety at risk. Thus, the addition of a precise detection system for motor vehicle brake pads is important for improving motor vehicle safety.

Most existing motor vehicle brake pad detection methods use a displacement sensor acquisition head to detect the degree of wear of the brake pad by contact, wherein the displacement sensor acquisition head is arranged in a position where the thickness of the brake pad friction material changes. In that measurement method, only when the brake pad is worn down to a defined thickness can the acquisition head acquire a signal and send it to a data processing system for processing, in order to issue an alarm signal, so that method cannot promptly acquire accurate, quantified brake pad thickness information. Moreover, since the sensor acquisition head will be worn as the brake pad is worn, such an arrangement will result in the sensor acquisition head needing to be replaced each time that the brake pads are replaced, thereby increasing the cost of detection.

SUMMARY OF THE INVENTION

In view of the above, according to a first aspect of the present invention, disclosed is a motor vehicle brake pad thickness detection system, comprising a brake disc, a brake pad, a brake caliper and a brake pad driving means, the brake caliper having a fixing part, and the brake pad being fixed to the fixing part; a first brake pad thickness detector is provided between the brake pad and the fixing part, and a second brake pad thickness detector is provided on the brake disc in a position corresponding to the first brake pad thickness detector.

In a feasible embodiment, the fixing part is provided with a first detector accommodating slot on a surface connected to the brake pad, and the first brake pad thickness detector is provided in the first detector accommodating slot.

In a feasible embodiment, the brake pad is provided with a first detector accommodating slot on a surface connected to the fixing part, and the first brake pad thickness detector is provided in the first detector accommodating slot.

In a feasible embodiment, a second detector accommodating slot is provided on the brake disc, the second detector accommodating slot being disposed on a surface of the brake disc which comes into contact with the brake pad and corresponding to the first brake pad thickness detector, and the second brake pad thickness detector is provided in the second detector accommodating slot.

In a feasible embodiment, the second brake pad thickness detector is dimensioned such that when the brake disc comes into contact with the brake pad, the second brake pad thickness detector does not come into contact with the brake pad.

In a feasible embodiment, the first brake pad thickness detector and the second brake pad thickness detector are Hall sensors or capacitive sensors.

In a feasible embodiment, the brake pad comprises a friction layer, a thermal insulation layer and a bonding layer.

In a feasible embodiment, the first brake pad thickness detector and the second brake pad thickness detector are electrically connected to an electronic control unit of the motor vehicle, and the electronic control unit of the motor vehicle is electrically connected to a braking torque detection system of a braking system; when a braking torque reaches a predetermined value, the electronic control unit of the motor vehicle will record, as an effective brake pad thickness value, a brake pad thickness value detected by the first brake pad thickness detector and the second brake pad thickness detector.

In a feasible embodiment, the electronic control unit of the motor vehicle is electrically connected to a motor vehicle dashboard; when the effective brake pad thickness value obtained by the electronic control unit of the motor vehicle is less than a predetermined threshold, the electronic control unit displays information about the need to replace the brake pad on a display screen of the motor vehicle dashboard.

In a feasible embodiment, the electronic control unit of the motor vehicle is electrically connected to the motor vehicle dashboard; when the effective brake pad thickness value obtained by the electronic control unit of the motor vehicle is less than 3 mm, the electronic control unit displays information about the need to replace the brake pad on the display screen of the motor vehicle dashboard.

The safety of the braking system is greatly improved due to the fact that the brake pad thickness detection system detects the thickness of the brake pad precisely each time braking is performed.

BRIEF DESCRIPTION OF THE DRAWINGS

Embodiments of the present invention are described in further detail below with reference to the accompanying drawings and particular embodiments, wherein.

DETAILED DESCRIPTION

Figure 1:
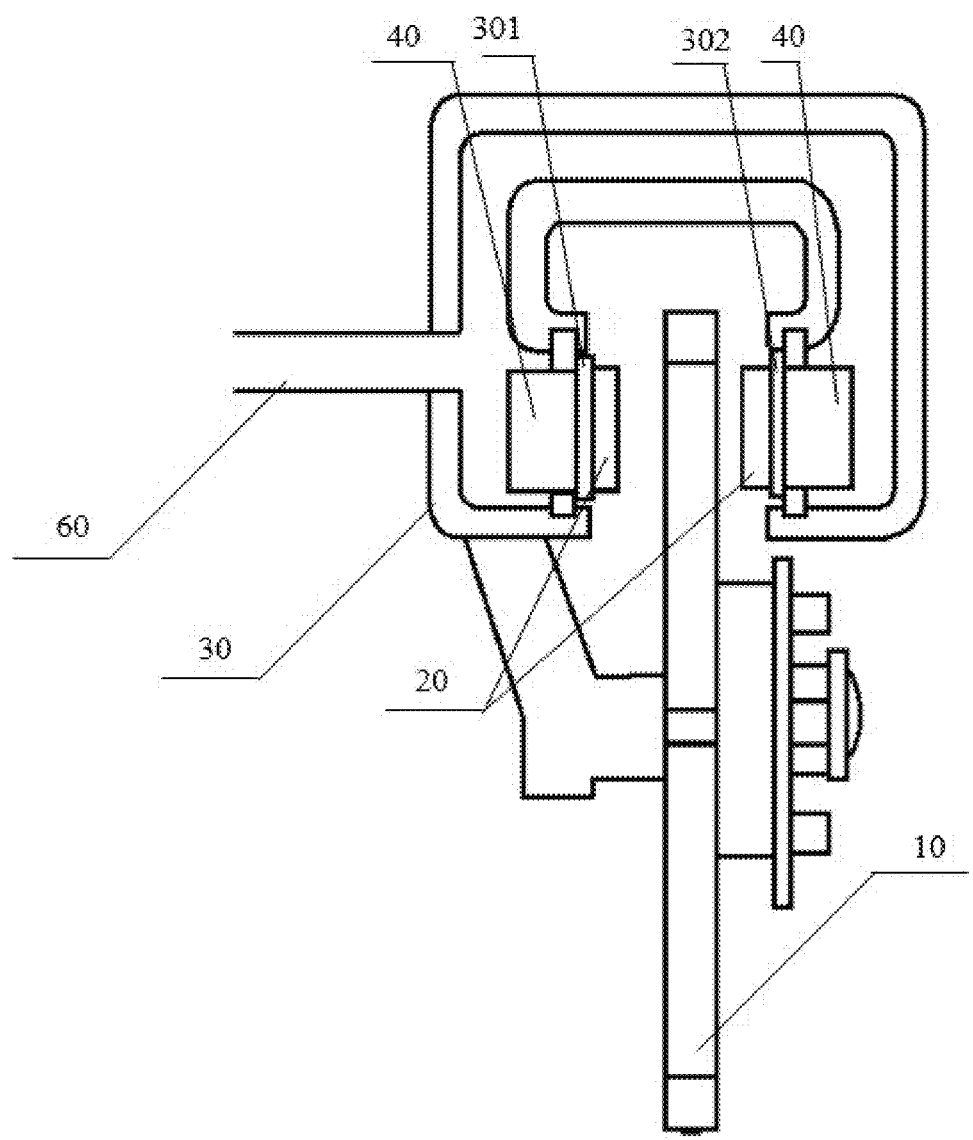
FIG. 1 is a schematic diagram of a motor vehicle braking system of the present invention.
Figure 2:
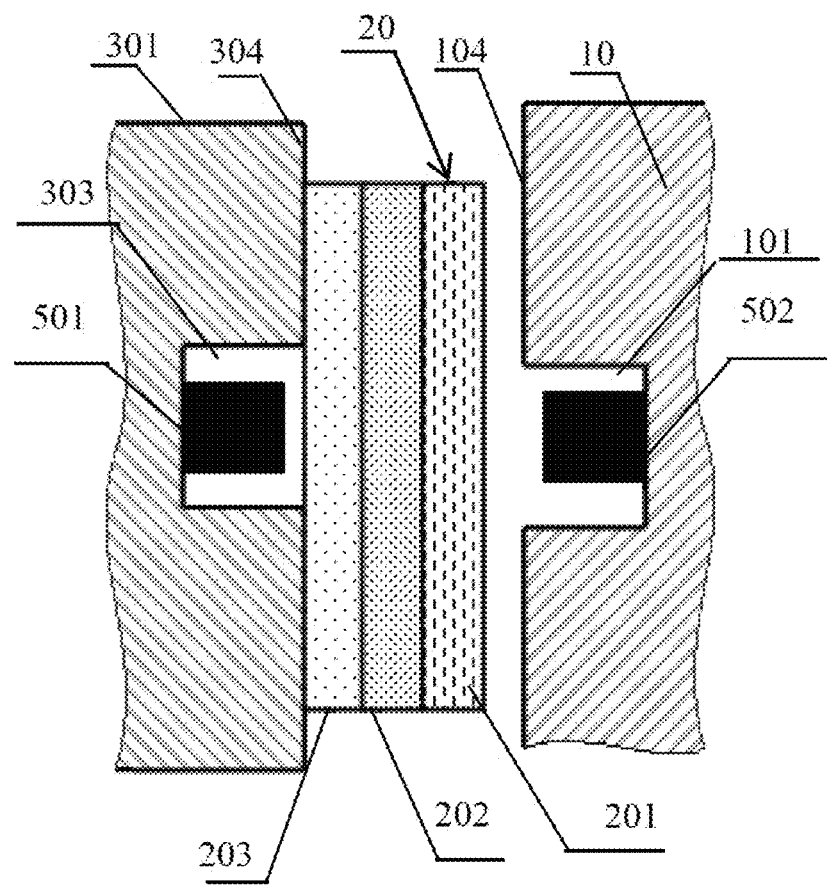
FIG. 2 is a partial enlarged drawing of a motor vehicle brake pad thickness detection system in a first embodiment of the present invention.
Figure 3:
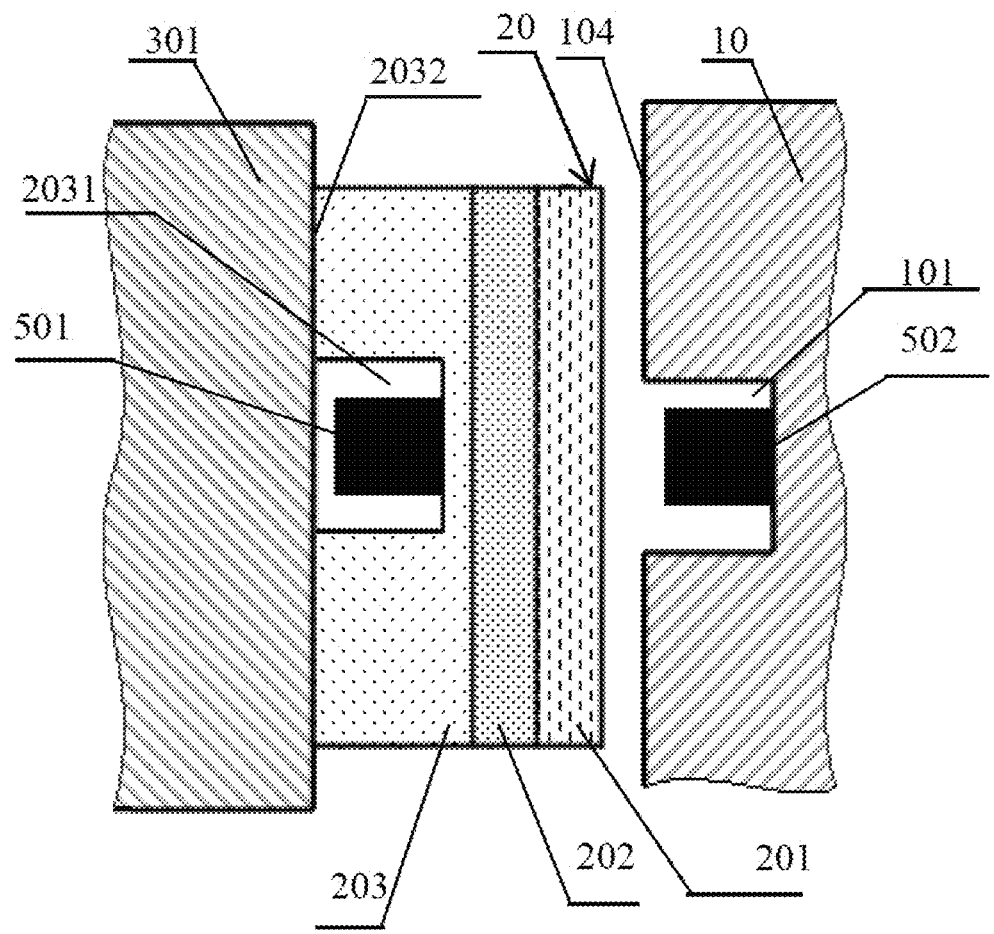
FIG. 3 is a partial enlarged drawing of a motor vehicle brake pad thickness detection system in a second embodiment of the present invention.

Referring to FIGS. 1 to 3, a motor vehicle brake pad thickness detection system of the present invention comprises a brake disc 10, brake pads 20, a brake caliper 30, a brake pad driving means and brake pad thickness detectors 501, 502. In this embodiment, a brake pedal (not shown in the figures), a brake fluid pump (not shown in the figures), a brake fluid pipe 60 and pistons 40 form the brake pad driving means for driving the movement of the brake pads 20. The brake caliper 30 has two fixing parts 301, 302; the two fixing parts 301, 302 are located on two sides of the brake disc respectively, and one brake pad 20 is connected in a fixed manner to each fixing part 301, 302. When the driver depresses the brake pedal (not shown in the figures), the brake pad driving means drives the brake pads 20. Specifically, the brake pedal pushes the brake fluid pump (not shown in the figures) to move, the brake fluid pump pushes the pistons 40 to move by means of the brake fluid pipe 60, and the pistons 40 drive the movement of the brake pads 20 fixed to the brake caliper 30, so that the brake pads 20 on the two sides of the brake disc 10 can come into contact with the brake disc 10, to perform braking control.

FIG. 2 is a partial enlarged drawing of a motor vehicle brake pad thickness detection system in a first embodiment of the present invention; the figure shows the brake disc 10 of the braking system, the brake pad 20 on one side of the brake disc 10, and the fixing part 301 of the brake caliper 30. The brake pad 20 comprises a friction layer 201, a thermal insulation layer 202 and a bonding layer 203. In this embodiment, the brake pad 20 is bonded to the fixing part 301 of the brake caliper 30 by means of the bonding layer 203. A first brake pad thickness detector 501 is provided between the brake pad 20 and the fixing part 301 of the brake caliper 30; a second brake pad thickness detector 502 is provided on the brake disc 10 in a position corresponding to the first brake pad thickness detector 501. Thus, the first brake pad thickness detector 501 and the second brake pad thickness detector 502 are disposed on two sides of the brake pad 20, and therefore will not suffer interference from other elements when detecting the thickness of the brake pad 20, so the detection result is more accurate. In this embodiment, on a surface 304 connected to the brake pad 20, the fixing part 301 is provided with a first detector accommodating slot 303, and the first brake pad thickness detector 501 is provided in the first detector accommodating slot 303, so that the first brake pad thickness detector 501 is disposed between the brake pad 20 and the fixing part 301. A second detector accommodating slot 101 is provided on the brake disc 10, on a surface 104 which comes into contact with the brake pad 20, and in a position corresponding to the first brake pad thickness detector 501, and the second brake pad thickness detector 502 is provided in the second detector accommodating slot 101.

The first brake pad thickness detector 501 and the second brake pad thickness detector 502 can be fixed in the first detector accommodating slot 303 and the second detector accommodating slot 101 respectively by means of a fixed connection such as a screw, a fastener or bonding. Preferably, in order to prevent wear to the second brake pad thickness detector 502 when braking, the second brake pad thickness detector 502 is dimensioned such that when the brake disc 10 comes into contact with the brake pad 20, the second brake pad thickness detector 502 does not come into contact with the brake pad 20. Thus, when the brake pad 20 comes into contact with the brake disc 10 during braking, the brake pad 20 will not come into contact with the second brake pad thickness detector 502, so the second brake pad thickness detector 502 will not be worn.

In this embodiment, the first brake pad thickness detector 501 and the second brake pad thickness detector 502 are Hall sensors. When the brake pad 20 is worn, the thickness of the brake pad 20 will change, and an inductance value between the first brake pad thickness detector 501 and the second brake pad thickness detector 502 consisting of the Hall sensors will change; the change in thickness of the brake pad 20 is thereby measured. Of course, the first brake pad thickness detector 501 and the second brake pad thickness detector 502 may also consist of other thickness measurement sensors such as capacitive sensors; this will not be further described superfluously here.

FIG. 3 is a partial enlarged drawing of a motor vehicle brake pad thickness detection system in a second embodiment of the present invention. This figure also shows the brake disc 10 in the braking system, the brake pad 20 on one side of the brake disc 10, and the fixing part 301 of the brake caliper 30. In this embodiment, the brake pad 20 is bonded to the fixing part 301 of the brake caliper 30 by means of the bonding layer 203; on a surface 2032 connected to the fixing part 30, the brake pad 20 is provided with a first detector accommodating slot 2031, and the first brake pad thickness detector 501 is disposed in the first detector accommodating slot 2031, so that the first brake pad thickness detector 501 is disposed between the brake pad 20 and the fixing part 301. In this embodiment, other elements and structures are the same as in the first embodiment, so are not described here superfluously again. Furthermore, according to the present invention, it is only necessary to have the first brake pad thickness detector 501 disposed between the brake pad 20 and the fixing part 301; there is no restriction to the design of the first detector accommodating slots 303, 2031 in the first and second embodiments, and those skilled in the art could still make various changes and improvements.

A left front wheel, a right front wheel, a left rear wheel and a right rear wheel of the motor vehicle may each be provided with the motor vehicle brake pad thickness detection system of the present invention.

Figure 4:
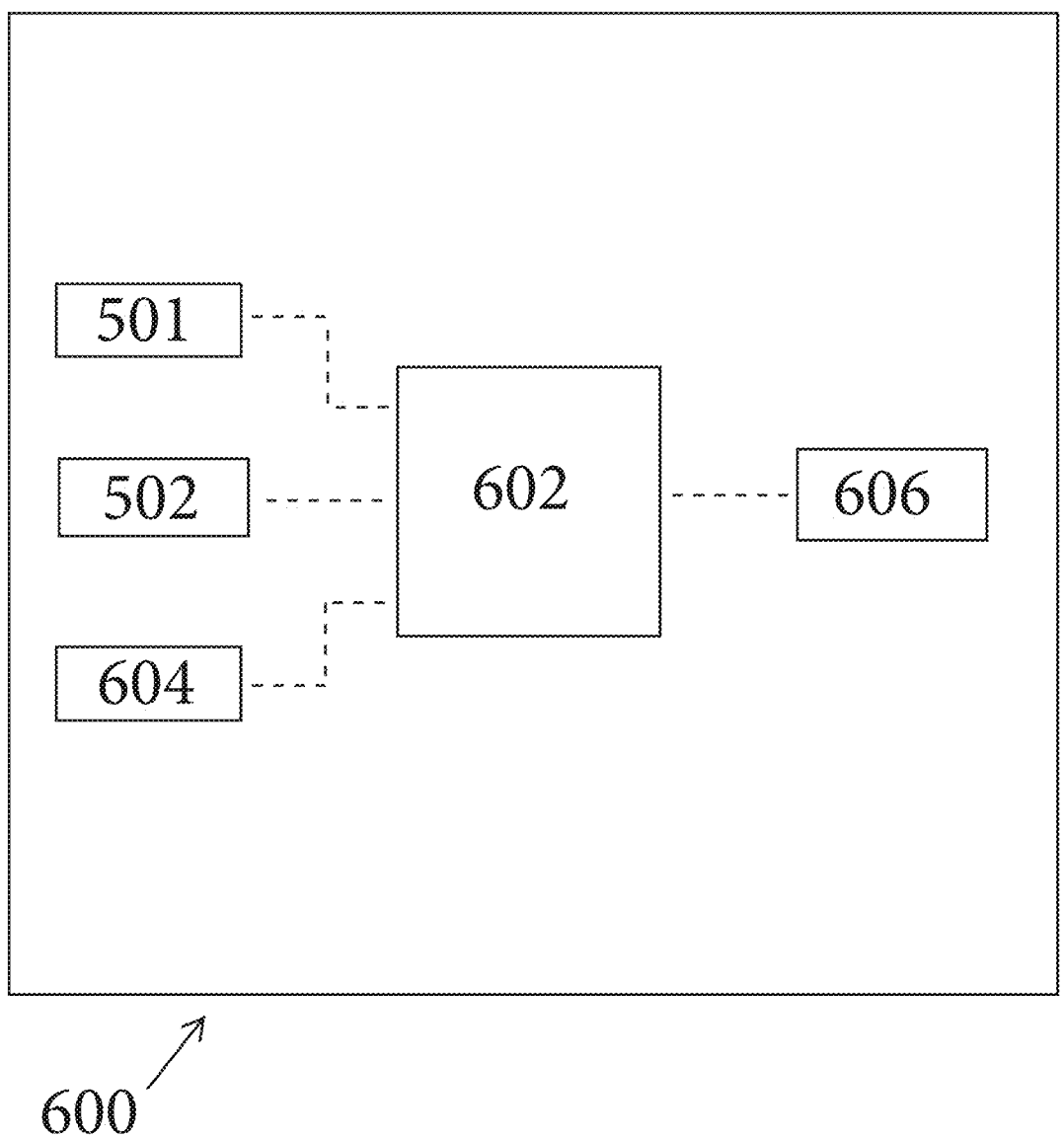
FIG. 4 is a schematic view of a motor vehicle having the motor vehicle braking system of the present invention.

FIG. 4 schematically illustrates a motor vehicle 600 having the motor vehicle brake pad thickness detection system. The first brake pad thickness detector 501 and the second brake pad thickness detector 502 are electrically connected to an electronic control unit (ECU) 602 of the motor vehicle, and the ECU of the motor vehicle is electrically connected to a braking torque detection system 604 of the braking system and to a motor vehicle dashboard 606. When the braking torque reaches a predetermined value, the ECU of the motor vehicle will record, as an effective brake pad thickness value, a brake pad thickness value detected by the first brake pad thickness detector and the second brake pad thickness detector. When the effective brake pad thickness value obtained by the ECU of the motor vehicle is less than 3 mm, the ECU displays information about the need to replace the brake pad on a display screen of the motor vehicle dashboard.

The specific procedure for detecting the thickness of the brake pad 20 is as follows: when the driver depresses the brake pedal, the brake pad driving means drives the brake pad 20 to move towards the brake disc 10, so that the brake pad 20 comes into contact with the brake disc 10; at this time, the first brake pad thickness detector 501 and the second brake pad thickness detector 502 detect the thickness of the brake pad 20, and transmit a thickness value of the brake pad 20 to the ECU of the motor vehicle. At the same time, the ECU of the motor vehicle also obtains a braking torque value of the braking system from the braking torque detection system (not shown in the figures). Only when the braking torque reaches a predetermined value will the ECU of the motor vehicle record, as an effective brake pad thickness value, the thickness of the brake pad 20 detected by the first brake pad thickness detector 501 and the second brake pad thickness detector 502, thereby avoiding a situation where a measured brake pad thickness value is inaccurate due to an erroneous operation by the driver. When the effective brake pad thickness value obtained by the ECU of the motor vehicle is less than a predetermined threshold, preferably less than 3 mm, the ECU will issue early warning information, and display information about the need to replace the brake pad on a display screen of the motor vehicle dashboard, thereby reminding the driver to replace the brake pad.

The safety of the braking system is greatly improved due to the fact that the brake pad thickness detection system detects the thickness of the brake pad 20 each time braking is performed, and will issue early warning information when brake pad wear reaches a limit, to remind the driver to carry out replacement. Furthermore, since the first brake pad thickness detector 501 and the second brake pad thickness detector 502 are arranged so as not to come into contact with the brake pad 20, the first brake pad thickness detector 501 and the second brake pad thickness detector 502 will not be worn when measuring the thickness of the brake pad 20; hence, when the brake pad 20 is replaced, there is no need to replace the first brake pad thickness detector 501 and the second brake pad thickness detector 502, so the cost of detection can be greatly reduced.

A number of particular embodiments have been set out above to expound in detail the motor vehicle brake pad thickness detection system of the present invention. These examples are merely intended to illustrate the principles and embodiments of the present invention, without limiting the present invention. Those skilled in the art could still make various changes and improvements without departing from the spirit and scope of the present invention. Thus, all equivalent technical solutions should fall within the category of the present invention and are defined by the claims of the present invention.

The invention claimed is:

1. A motor vehicle brake pad thickness detection system, comprising
   a brake disc,
   a brake caliper having a fixing part,
   a brake pad fixed to the fixing part,
   a brake pad driving means,
   a first brake pad thickness detector between the brake pad and the fixing part, and
   a second brake pad thickness detector on the brake disc in a position corresponding to the first brake pad thickness detector
   characterized in that the second brake pad thickness detector is dimensioned such that when the brake disc comes into contact with the brake pad, the second brake pad thickness detector does not come into contact with the brake pad.

2. The motor vehicle brake pad thickness detection system according to claim 1, characterized in that a second detector accommodating slot is provided on the brake disc, the second detector accommodating slot being disposed on a surface of the brake disc which comes into contact with the brake pad and corresponding to the first brake pad thickness detector, and the second brake pad thickness detector is provided in the second detector accommodating slot.

3. The motor vehicle brake pad thickness detection system according to claim 2, characterized in that the first brake pad thickness detector and the second brake pad thickness detector are Hall sensors or capacitive sensors.

4. The motor vehicle brake pad thickness detection system according to claim 3, characterized in that the brake pad comprises a friction layer, a thermal insulation layer and a bonding layer.

5. The motor vehicle brake pad thickness detection system according to claim 4, characterized in that the first brake pad thickness detector and the second brake pad thickness detector are electrically connected to an electronic control unit of the motor vehicle, and the electronic control unit of the motor vehicle is electrically connected to a braking torque detection system of a braking system; when a braking torque reaches a predetermined value, the electronic control unit of the motor vehicle will record, as an effective brake pad thickness value, a brake pad thickness value detected by the first brake pad thickness detector and the second brake pad thickness detector.

6. The motor vehicle brake pad thickness detection system according to claim 5, characterized in that the electronic control unit of the motor vehicle is electrically connected to a motor vehicle dashboard; when the effective brake pad thickness value obtained by the electronic control unit of the motor vehicle is less than a predetermined threshold, the electronic control unit displays information about the need to replace the brake pad on a display screen of the motor vehicle dashboard.

7. The motor vehicle brake pad thickness detection system according to claim 6, characterized in that the electronic control unit of the motor vehicle is electrically connected to the motor vehicle dashboard; when the effective brake pad thickness value obtained by the electronic control unit of the motor vehicle is less than 3 mm, the electronic control unit displays information about the need to replace the brake pad on the display screen of the motor vehicle dashboard.

8. A motor vehicle comprising the motor vehicle brake pad thickness detection system according to claim 4, the motor vehicle also comprising an electronic control unit and a braking system having a braking torque detection system, characterized in that the first brake pad thickness detector and the second brake pad thickness detector are electrically connected to the electronic control unit, and the electronic control unit of the motor vehicle is electrically connected to the braking torque detection system, and wherein, when a braking torque reaches a predetermined value, the electronic control unit records, as an effective brake pad thickness value, a brake pad thickness value detected by the first brake pad thickness detector and the second brake pad thickness detector.

9. The motor vehicle according to claim 8, further comprising a motor vehicle dashboard, wherein the electronic control unit is electrically connected to the motor vehicle dashboard, and wherein, when the effective brake pad thickness value obtained by the electronic control unit is less than a predetermined threshold, the electronic control unit displays information about the need to replace the brake pad on a display screen of the motor vehicle dashboard.

10. The motor vehicle according to claim 9, characterized in that the electronic control unit is electrically connected to the motor vehicle dashboard, and wherein, when the effective brake pad thickness value obtained by the electronic control unit is less than 3 mm, the electronic control unit displays information about the need to replace the brake pad on the display screen of the motor vehicle dashboard.

11. The motor vehicle brake pad thickness detection system according to claim 1, characterized in that the first brake pad thickness detector and the second brake pad thickness detector are Hall sensors or capacitive sensors.

12. The motor vehicle brake pad thickness detection system according to claim 11, characterized in that the brake pad comprises a friction layer, a thermal insulation layer and a bonding layer.

13. The motor vehicle brake pad thickness detection system according to claim 12, characterized in that the first brake pad thickness detector and the second brake pad thickness detector are electrically connected to an electronic control unit of the motor vehicle, and the electronic control unit of the motor vehicle is electrically connected to a braking torque detection system of a braking system; when a braking torque reaches a predetermined value, the electronic control unit of the motor vehicle will record, as an effective brake pad thickness value, a brake pad thickness value detected by the first brake pad thickness detector and the second brake pad thickness detector.

14. The motor vehicle brake pad thickness detection system according to claim 13, characterized in that the electronic control unit of the motor vehicle is electrically connected to a motor vehicle dashboard; when the effective brake pad thickness value obtained by the electronic control unit of the motor vehicle is less than a predetermined threshold, the electronic control unit displays information about the need to replace the brake pad on a display screen of the motor vehicle dashboard.

15. The motor vehicle brake pad thickness detection system according to claim 14, characterized in that the electronic control unit of the motor vehicle is electrically connected to the motor vehicle dashboard; when the effective brake pad thickness value obtained by the electronic control unit of the motor vehicle is less than 3 mm, the electronic control unit displays information about the need to replace the brake pad on the display screen of the motor vehicle dashboard.

16. The motor vehicle brake pad thickness detection system according to claim 1, characterized in that the fixing part is provided with a first detector accommodating slot on a surface connected to the brake pad, and the first brake pad thickness detector is provided in the first detector accommodating slot.

17. The motor vehicle brake pad thickness detection system according to claim 1, characterized in that the brake pad is provided with a first detector accommodating slot on a surface connected to the fixing part, and the first brake pad thickness detector is provided in the first detector accommodating slot.

* * * * *